US011885255B2

(12) United States Patent
Popa et al.

(10) Patent No.: US 11,885,255 B2
(45) Date of Patent: Jan. 30, 2024

(54) MULTIPORT VALVE

(71) Applicant: Vitesco Technologies GmbH, Hannover (DE)

(72) Inventors: Alexandru Popa, Munich (DE); Daniel-Marius Pop, Munich (DE); George Plaeru, Munich (DE); Cosmin Ion Belin, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 92 days.

(21) Appl. No.: 17/605,670

(22) PCT Filed: Apr. 7, 2020

(86) PCT No.: PCT/EP2020/059866
§ 371 (c)(1),
(2) Date: Oct. 22, 2021

(87) PCT Pub. No.: WO2020/216610
PCT Pub. Date: Oct. 29, 2020

(65) Prior Publication Data
US 2022/0205381 A1   Jun. 30, 2022

(30) Foreign Application Priority Data

Apr. 23, 2019   (EP) .................................... 19465529

(51) Int. Cl.
*F01P 7/14* (2006.01)
*F16K 11/087* (2006.01)
(Continued)

(52) U.S. Cl.
CPC ............ *F01P 7/14* (2013.01); *F16K 11/0873* (2013.01); *F01P 7/165* (2013.01);
(Continued)

(58) Field of Classification Search
CPC ........ F01P 7/14; F01P 2007/146; F01P 7/165; F16K 11/0873; F16K 5/0689; F16K 5/204; F16K 5/0605

See application file for complete search history.

(56) References Cited

U.S. PATENT DOCUMENTS 3,473,554 A   10/1969   King
6,688,333 B2 *   2/2004   McLane .............. F16K 11/0856
123/41.1

(Continued)

FOREIGN PATENT DOCUMENTS

CN   106014590   10/2016
DE   102016001026   12/2017

(Continued)

OTHER PUBLICATIONS

Office Action dated Jun. 13, 2022 issued in European Patent Application No. 19465529.6.

(Continued)

*Primary Examiner* — Craig M Schneider
*Assistant Examiner* — Christopher D Ballman
(74) *Attorney, Agent, or Firm* — Cozen O'Connor

(57) ABSTRACT

A multiport valve, having a housing having at least two connectors, a control element for blocking at least one of the connectors, the control element disposed to be rotatable in a recess of the housing. An external contour of the control element has a compression portion which in at least one first position of the control element compresses a first seal disposed on a first one of the connectors. The external contour of the control element has a decompression portion that has a smaller radius than the compression portion and in at least one further position of the control element lies (Continued)

opposite the first seal such that the control element compresses the first seal to a lesser extent than in the first position.

16 Claims, 2 Drawing Sheets

(51) Int. Cl.
*F16K 5/06* (2006.01)
*F16K 5/20* (2006.01)
*F01P 7/16* (2006.01)

(52) U.S. Cl.
CPC ....... *F01P 2007/146* (2013.01); *F16K 5/0605* (2013.01); *F16K 5/0689* (2013.01); *F16K 5/204* (2013.01)

(56) References Cited

U.S. PATENT DOCUMENTS

| | | | |
|---|---|---|---|
| 7,168,397 B2 * | 1/2007 | Chanfreau | B60H 1/00485 123/41.01 |
| 7,891,376 B2 * | 2/2011 | Neuhauser | F16K 1/446 137/312 |
| 8,596,302 B2 * | 12/2013 | Fontenit | F16K 1/446 137/637.2 |
| 8,671,982 B2 * | 3/2014 | Stoermer | F16K 11/0856 123/41.1 |
| 9,670,825 B2 * | 6/2017 | Murakami | F01P 3/20 |
| 10,344,877 B2 * | 7/2019 | Roche | B60L 58/26 |
| 10,544,725 B2 * | 1/2020 | Schaefer | F16K 11/0876 |
| 10,690,040 B2 * | 6/2020 | Jang | F01P 7/16 |
| 10,704,453 B2 * | 7/2020 | Park | F01P 7/14 |
| 10,927,972 B2 * | 2/2021 | Murakami | F16K 31/002 |
| 10,968,809 B2 * | 4/2021 | Yoshimura | F16K 11/076 |
| 11,168,797 B2 * | 11/2021 | Dragojlov | F16K 31/535 |
| 2006/0237359 A1 * | 10/2006 | Lin | F16K 11/085 210/438 |
| 2010/0319796 A1 * | 12/2010 | Whitaker | F16K 11/085 137/625.46 |
| 2011/0309280 A1 | 12/2011 | Wincek | |
| 2015/0075658 A1 * | 3/2015 | Tsuchiya | F16K 5/0407 251/309 |
| 2016/0003126 A1 * | 1/2016 | Carns | F16K 5/0605 251/304 |
| 2017/0089482 A1 * | 3/2017 | Dieterich | F16K 11/0856 |
| 2021/0033201 A1 | 2/2021 | Yan | |

FOREIGN PATENT DOCUMENTS

| | | |
|---|---|---|
| DE | 102018124112 | 4/2019 |
| EP | 1108867 | 6/2001 |
| EP | 3561346 | 10/2019 |
| EP | 3775638 | 2/2021 |

OTHER PUBLICATIONS

Office Action of the corresponding European Patent Application No. 19465529.6.

Office Action dated Feb. 18, 2023 issued in Chinese Patent Application No. 202080030466.X.

* cited by examiner

MULTIPORT VALVE

CROSS REFERENCE TO RELATED APPLICATIONS

This is a U.S. national stage of Application No. PCT/EP2020/059866 filed Apr. 7, 2020. Priority is claimed on European Application No. 19465529.6 filed Apr. 23, 2019 the content of which is incorporated herein by reference.

BACKGROUND OF THE INVENTION

1. Field of the Invention

The present disclosure relates to a multiport valve, in particular a cooling water valve for a motor vehicle, or of a motor vehicle, respectively, as well as to a method for activating the multiport valve.

SUMMARY OF THE INVENTION

It is an object of one aspect of the present invention to improve a multiport valve.

Disclosed is achieved a multiport valve, a motor vehicle having at least one multiport valve described here, and for a method for activating a multiport valve described here, respectively.

According to one aspect of the present invention, a multiport valve has a single-part or multiple-part housing having two or more, preferably at least or exactly three or four, connectors, as well as a single-part or multiple-part control element which selectively blocks one or a plurality of said connectors, or is provided to this end, in particular is specified or used to this end, respectively.

The control element according to one aspect of the present invention is disposed so as to be rotatable in a recess of the housing, so as to be rotatable in particular about a rotation axis and/or in various positions.

One aspect of the present invention can be particularly advantageously used in the case of such multiport valves.

According to one aspect of the present invention, an external contour of the control element has a compression portion, in one embodiment a (radial) shell face, in one refinement a convex or outwardly curved, respectively, (radial) shell face, which in at least one first position of the control element compresses, in one embodiment at least in a partially elastic manner, a first seal which is disposed on a first one of said connectors, or said compression portion being configured or specified or used, respectively, in such a manner or to this end, respectively. In one refinement, the control element in the first position blocks the first connector, or is configured or specified, respectively, in such a manner or to this end, respectively, or is used to this end, respectively.

On account thereof, the blocking can be improved.

According to one aspect of the present invention, the external contour of the control element has a decompression portion which has a smaller radius than the compression portion and, in at least one further position of the control element in which the control element in one embodiment does not block the first connector, lies opposite the first seal, or faces the latter, respectively, such that the control element in said further position compresses the first seal to a lesser extent than in the first position, or is configured or specified or used, respectively, in such a manner or to this end, respectively.

On account thereof, the first seal, when not required, is de-stressed in one embodiment. On account thereof, the service life, the reliability and/or the sealing effect of the seal can be increased and/or an operating force for adjusting the multiport valve can be reduced in one embodiment.

The radius of the compression portion, or the (smaller) radius of the decompression portion, respectively, in one embodiment is an in particular maximum, minimum, or mean distance or spacing, respectively, of the respective portion or the external contour, respectively, from the rotation axis of the control element in at least one cross section, in one embodiment in at least one cross section perpendicular to the rotation axis, wherein said cross section in one embodiment also intersects the respective seal.

The decompression portion in said further position of the control element in one embodiment supports the first seal in relation to the housing, or is configured or specified, respectively, in such a manner or to this end, respectively, or is used to this end, respectively.

On account thereof, the risk of the first seal undesirably falling out of a receptacle can be reduced in one embodiment, and on account thereof the functioning and/or the reliability of the multiport valve can be improved.

Additionally or alternatively, the decompression portion in the further position in one embodiment does not compress the first seal, or is configured or specified, respectively, in such a manner or to this end, respectively.

On account thereof, the first seal is particularly intensely de-stressed in one embodiment. On account thereof, the service life, the reliability and/or the sealing effect of the seal can be further increased and/or an operating force for adjusting the multiport valve can be further reduced in one embodiment.

In one embodiment, the compression portion in at least one second position of the control element compresses a second seal disposed on a second one of the connectors, or is configured or specified, respectively, in such a manner or to this end, respectively, or is used to this end, respectively. In one refinement, the control element in the second position blocks the second connector, or is configured or specified, respectively, in such a manner or to this end, respectively, or is used to this end, respectively.

On account thereof, the blocking can be improved in one embodiment.

In one aspect of the invention, the control element in the second position compresses the second seal to a greater extent than in at least one other position of the control element, in one embodiment to a greater extent than in the first position of the control element, or is configured or specified, respectively, in such a manner or to this end, respectively, or is used to this end, respectively. In one refinement, the control element in said other position does not block the second connector, or is configured or specified, respectively, in such a manner or to this end, respectively, or is used to this end, respectively. Additionally or alternatively, in one embodiment, in particular to this end, the decompression portion in this other position lies opposite the second seal.

On account thereof, the second seal, when not required, is de-stressed in one embodiment. On account thereof, the service life, the reliability and/or the sealing effect of the seal can be increased and/or an operating force for adjusting the multiport valve can be reduced in one embodiment.

In one embodiment, the decompression portion in said other position of the control element, in one embodiment thus in the first position, supports the second seal in relation to the housing, or is configured or specified, respectively, in such a manner or to this end, respectively, or is used to this end, respectively.

On account thereof, the risk of the second seal undesirably falling out of a receptacle can be reduced in one embodiment, and on account thereof the functioning and/or the reliability of the multiport valve can be improved.

Additionally or alternatively, the decompression portion in the other position in one embodiment does not compress the second seal, or is configured or specified, respectively, in such a manner or to this end, respectively.

On account thereof, the second seal is particularly intensely de-stressed. On account thereof, the service life, the reliability and/or the sealing effect of the seal can be further increased and/or an operating force for adjusting the multiport valve can be further reduced.

In particular, the control element, or the external contour thereof, respectively, can thus be configured such that the compression portion in the first position compresses, in particular at least in a partially elastic manner, the first seal, and in the second position compresses, in particular at least in a partially elastic manner, the second seal, and by contrast the decompression portion in the first position de-stresses, or compresses to a lesser extent, or optionally not at all, the second seal, and in the second position de-stresses, or compresses to a lesser extent, or optionally not at all, the first seal.

In one embodiment, in the adjustment of the control element from the first to the second position, the decompression portion instead of the compression portion is disposed in front of the first connector, and the compression portion instead of the decompression portion is disposed in front of the second connector, and on account thereof a compression of the first seal by the control element is, preferably continuously, reduced, or a compression of the second seal by the control element is, preferably in a continuous and/or opposing manner, amplified, and conversely, in the adjustment of the control element from the second to the first position, the compression portion instead of the decompression portion is disposed in front of the first connector, and the decompression portion instead of the compression portion is disposed in front of the second connector, and on account thereof a compression of the second seal by the control element is, preferably continuously, reduced, or a compression of the first seal by the control element is continuously and/or in an opposing manner, amplified.

Additionally or alternatively, according to one aspect of the invention, in particular when viewed in a circumferential direction or rotation direction, respectively, about the rotation axis, at least, in one embodiment exactly, one further (third) of the connectors is disposed between the first and the second connector, said further (third) one of the connectors in the first position of the control element being (fluidically) connected to the second connector, or communicating therewith, respectively, and/or in the second position of the control element being (fluidically) connected to the first connector, or communicating therewith, respectively.

One aspect of the present invention can particularly advantageously be used, and/or a (more) compact multiport valve can be implemented, in the case of such a connector arrangement.

According to one aspect of the invention, the control element in at least one third position of the control element, in which the latter in one embodiment does not block the first and the second connector, compresses the first seal to a lesser extent than in the first position, and/or compresses the second seal to a lesser extent than in the second position, in one embodiment compresses said seal (in each case) only in portions and/or to a lesser extent, or is configured or specified, respectively, in such a manner or to this end, respectively, or is used to this end, respectively.

On account thereof, the respective seal is particularly intensely de-stressed in one embodiment. On account thereof, the service life, the reliability and/or the sealing effect of the seal can be further increased and/or an operating force for adjusting the multiport valve can be further reduced in one embodiment.

Additionally or alternatively, the control element in one embodiment, in at least one, or the third, respectively, position in which the control element does not block the first and the second connector in one embodiment, supports the first seal and/or the second seal in relation to the housing, or is configured or specified, respectively, in such a manner or to this end, respectively, or is used to this end, respectively.

On account thereof, the risk of the respective seal undesirably falling out of a receptacle can be further reduced in one embodiment, and on account thereof the functioning and/or the reliability of the multiport valve can be further improved.

Additionally or alternatively, in one embodiment the control element in said third position does not compress the first seal and/or the second seal, or is configured or specified, respectively, in such a manner or to this end, respectively.

On account thereof, the respective seal is particularly intensely de-stressed in one embodiment. On account thereof, the service life, the reliability and/or the sealing effect of the seal can be further increased and/or an operating force for adjusting the multiport valve can be further reduced in one embodiment.

In one aspect of the invention, the control element (also) in said third position compresses the first seal and/or the second seal, or is configured or specified, respectively, in such a manner or to this end, respectively.

On account thereof, the adjustment of the multiport valve, and/or progressive compressing of the first or the second, respectively, seal when adjusting to the first or the second, respectively, position, is improved in one embodiment.

In one aspect of the invention, the control element in at least one position, in particular the first, the second, and/or the third position, by way of a through passage of the control element, connects (in each case) at least two of the connectors, said through passage in one embodiment having at least one, in particular lateral or radial, respectively, slot referred to as a "slotted through passage", and in at least one other position of the control element blocks at least one of said at least two connectors; in one refinement the control element in at least one position, by way of the through passage, connects at least three of the connectors, or is configured or specified, respectively, in this manner or to this end, respectively, or is used to this end, respectively.

In one refinement:
  the control element in the second position, by way of the through passage, connects the first connector and at least one further (third) of the connectors, and in the first position blocks the first connector; and/or
  the control element in the first position, by way of the through passage, connects the second connector and at least one, in particular said further (third), of the connectors, and in the second position blocks the second connector; and/or the control element in the third position, by way of the through passage, connects the first and the second connector and at least one, in particular said further (third), of the connectors, or is configured or specified, respectively, in such a manner or to this end, respectively, or is used to this end, respectively.

One aspect of the present invention can particularly advantageously be used, and/or a compact multiport valve can be implemented, in the case of such a connector arrangement.

In one aspect of the invention, the slot is entirely or partially disposed in the decompression portion.

On account thereof, stress on and/or the risk of damage to the first and/or the second seal by way of the slot, or the external edge(s) of the latter, can advantageously be reduced.

In one aspect of the invention, the compression portion and the decompression portion gradually transition into one another, in particular without a step; in one embodiment the radius of the external contour of the control element decreases continuously from the compression portion to the decompression portion, this in one embodiment being monotonous.

On account thereof, in one aspect of the invention, local stress on the respective seal can be reduced or avoided, respectively, and the service life, the reliability and/or the sealing effect of this seal can be further increased on account thereof.

In one aspect of the invention, the first seal is configured so as to be in multiple parts and/or annular; said first seal can in particular have an elastic ring which in one embodiment is disposed on one support ring or between two support rings, wherein in one embodiment the support ring, or one of the support rings, respectively, is supported on the housing, or on the first connector, respectively, and/or the support ring, or one of the support rings, respectively, is supported on the control element. Additionally or alternatively, in one embodiment, the second seal is configured so as to be in multiple parts and/or annular; said second seal can in particular have an elastic ring which in one embodiment is disposed on one support ring or between two support rings, wherein in one embodiment the support ring, or one of the support rings, respectively, is supported on the housing, or on the second connector, respectively, and/or the support ring, or one of the support rings, respectively, is supported on the control element.

One aspect of the present invention can be particularly advantageously used in the case of such seals.

One aspect of the present invention, in particular by virtue of the thermal, aerodynamic, and/or mechanical boundary conditions and/or installation situations, can particularly advantageously be used in motor vehicles and/or as a cooling water (control or regulating, respectively) valve.

According to one aspect of the present invention, for activating a multiport valve described here, the control element is adjusted between the first position, in which the compression portion compresses the first seal and the control element in one embodiment blocks the first connector, and one, or the, respectively, further position, in which the decompression portion lies opposite the first seal, such that the control element compresses the first seal to a lesser extent than in the first position, wherein the control element in one embodiment in this further position does not block the first connector.

BRIEF DESCRIPTION OF THE DRAWINGS

Aspects of the invention will be described in detail hereunder with reference to figurative illustrations. Further advantageous refinements of the invention are derived from the dependent claims and from the description hereunder of preferred embodiments. In the figures, in part in a schematic manner:

Identical features, or features of equivalent function, are provided with the same reference signs in all figures.

DETAILED OF THE PRESENTLY PREFERRED EMBODIMENTS

Figure 1:
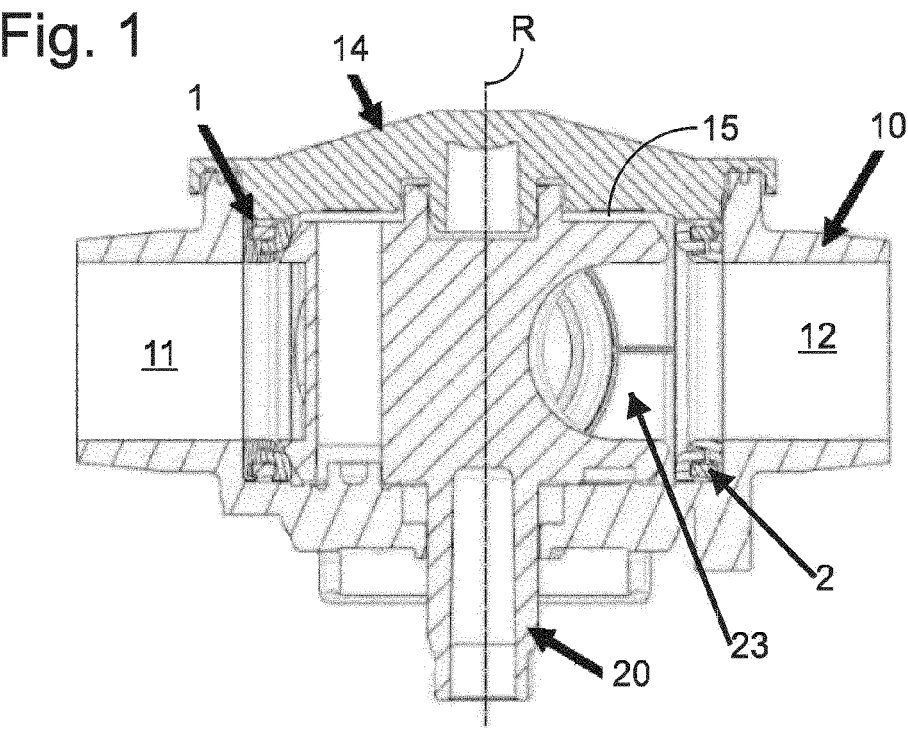
FIG. 1 is a multiport valve in a longitudinal section.

FIG. 1 shows a multiport valve according to one aspect of the present invention, in a longitudinal section, which includes a rotation axis R.

Figure 2:
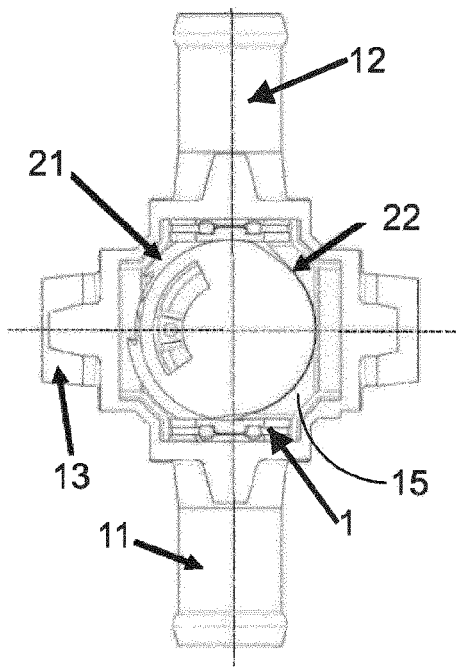
FIG. 2 is the multiport valve without a housing cover, in a plan view.

The multiport valve has a multiple-part housing having a housing main body 10 and a housing cover 14, which is omitted in the plan view of FIG. 2.

The housing has a first connector 11, a second connector 12, and a third connector 13.

A control element 20 for selectively blocking the first or the second connector 11 or 12, respectively, is mounted so as to be rotatable in a recess 15 of the housing about the rotation axis R.

Figure 3A:
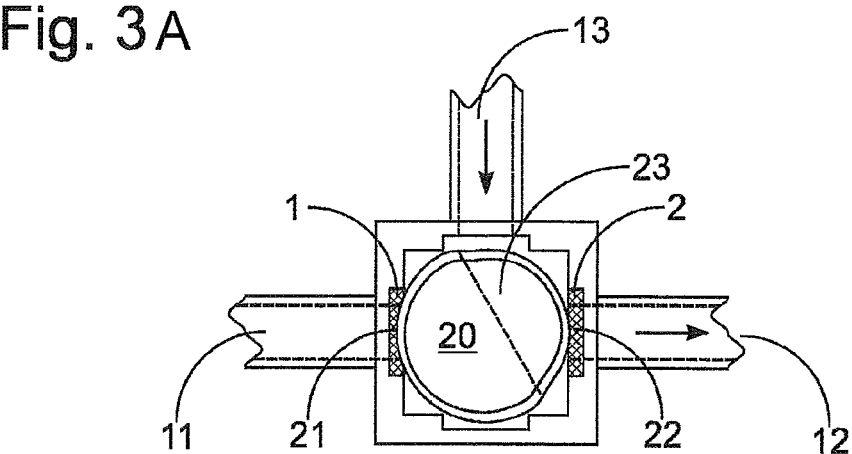
FIGS. 3A-3C is a method for activating the multiport valve, or various positions of a control element of the multiport valve, respectively.

An external contour, or shell face, respectively, of the control element 20 has a compression portion 21 that, in a first position (cf. FIG. 3(a)) the control element 20 blocks the first connector 11 and compresses a multiple-part annular first seal 1 which is disposed on the first connector 11.

Figure 3B:
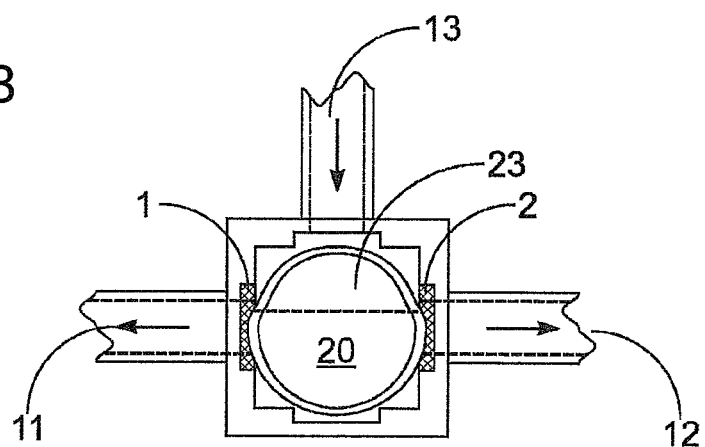
Figure 3C:
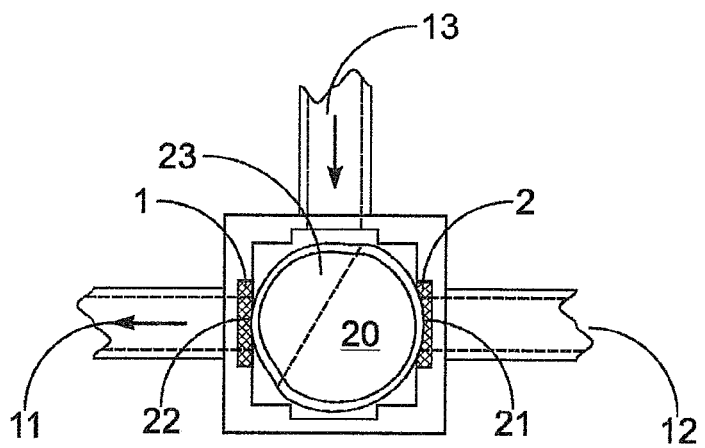

The external contour of the control element 20 has a decompression portion 22 which, in a second position of the control element 20 (cf. FIG. 3(c)) the control element does not block the first connector 11, lies opposite the first seal 1, and has a smaller radius than the compression portion 21, such that the control element 20 in the second position compresses the first seal 1 to a lesser extent than in the first position, wherein the decompression portion 22 in the second position of the control element furthermore supports the first seal 1 in relation to the housing.

The compression portion 21, in the second position of the control element (cf. FIG. 3(c)), the control element 20 blocks the second connector 12 and compresses a multiple-part annular second seal 2 disposed on the second connector 12.

The control element 20 in the second position (cf. FIG. 3(c)), by way of the compression portion 21 thereof, compresses the second seal 2 to a greater extent than by way of the decompression portion 22 thereof in the first position (cf. FIG. 3(a)), but by way of the decompression portion 22 thereof in the first position also supports the second seal 2 in relation to the housing.

In a third position of the control element 20 (cf. FIG. 3(b)) in which the control element 20 does not block the first and the second connector 11, 12, the control element 20 supports the two seals 1, 2 in relation to the housing.

The control element 20 in the first position (cf. FIG. 3(a)), by way of a passage opening having a lateral slot 23, connects the connectors 12 and 13, and in the second position of the control element (cf. FIG. 3(c)) blocks the second connector 12.

The control element 20 in the second position (cf. FIG. 3(c)), by way of the passage opening having the lateral slot 23, connects the connectors 11 and 13, and in the first position of the control element (cf. FIG. 3(a)) blocks the first connector 11.

The control element 20 in the third position (cf. FIG. 3(b)), by way of the passage opening having the lateral slot 23, connects the connectors 11, 12 and 13.

While exemplary embodiments have been explained in the preceding description, it is to be pointed out that a multiplicity of modifications are possible. It is moreover to be pointed out that the exemplary embodiments are merely examples which are not intended to limit in any way the scope of protection, the applications, and the construction. Rather, the above description will provide a person skilled in the art with a guideline for implementing at least one exemplary embodiment, wherein various modifications, in particular with regard to the function and arrangement of the described constituent parts, may be made without departing from the scope of protection as defined by the claims and by these equivalent combinations of features.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A multiport valve, comprising:
a housing having a recess and at least two connectors;
a control element configured to block at least one of the connectors, the control element being rotatably disposed in the recess of the housing;
an external contour of the control element has a compression portion that in at least one first position of the control element compresses a first seal disposed on a first one of the connectors; and
a decompression portion of the external contour of the control element that has a smaller radius of curvature than a radius of curvature of the compression portion and in at least one further position of the control element lies opposite the first seal such that the control element compresses the first seal to a lesser extent than in the at least one first position,
wherein the decompression portion of the external contour and the compression portion of the external contour are segments of nonconcentric circles.

2. The multiport valve as claimed in claim 1, wherein
the control element in the first position blocks the first connector, and/or
the control element in the further position does not block the first connector, and/or
wherein the decompression portion in the further position of the control element supports the first seal in relation to the housing and/or does not compress the first seal.

3. The multiport valve as claimed in claim 1, wherein the compression portion in at least one second position of the control element compresses a second seal disposed on a second one of the connectors.

4. The multiport valve as claimed in claim 3,
wherein the control element in the second position of the control element compresses the second seal to a greater extent than in at least the at least one first position of the control element, and/or
wherein at least one further connector is disposed between the first and the second connector.

5. The multiport valve as claimed in claim 4,
wherein the control element in the second position blocks the second connector and/or the control element in an other position does not block the second connector, and/or
wherein the decompression portion in the other position of the control element supports the second seal in relation to the housing and/or does not compress the second seal.

6. The multiport valve as claimed in claim 3,
wherein the control element in the second position blocks the second connector and/or the control element in an other position does not block the second connector, and/or
wherein the decompression portion in the other position of the control element supports the second seal in relation to the housing and/or does not compress the second seal.

7. The multiport valve as claimed in claim 3, wherein the control element in at least one third position of the control element in which the control element does not block the first and the second connector, compresses the first seal to a lesser extent than in the at least one first position, compresses the second seal to a lesser extent than in the second position, and/or supports the first and/or the second seal in relation to the housing.

8. The multiport valve as claimed in claim 3, wherein at least one of the first and the second seal is configured to be in multiple parts and/or annular.

9. The multiport valve as claimed in claim 1, wherein the control element in at least one position, by way of a slotted through passage of the control element, connects at least two of the connectors, and in at least one other position of the control element blocks at least one of the connectors.

10. The multiport valve as claimed in claim 9, wherein the slot of the through passage is at least partially disposed in the decompression portion, and/or the control element in at least one position, by way of the through passage, connects at least three connectors.

11. The multiport valve as claimed in claim 1, wherein the compression portion and the decompression portion gradually transition into one another.

12. The multiport valve as claimed in claim 1, wherein the multiport valve is a cooling water valve for a motor vehicle.

13. The multiport valve as claimed in claim 1, wherein the smaller radius of curvature is configured such that it is less than a diameter of the first one of the connectors and the radius of curvature of the compression portion is configured such that it is greater than a diameter of the first one of the connectors.

14. A motor vehicle comprising:
at least one multiport cooling water valve, comprising:
a housing having a recess and at least two connectors;
a control element configured to block at least one of the connectors, the control element being rotatably disposed in the recess of the housing;
an external contour of the control element has a compression portion that in at least one first position of the control element compresses a first seal disposed on a first one of the connectors; and a decompression portion of the external contour of the control element that has a smaller radius of curvature than a radius of curvature of the compression portion and in at least one further position of the control element lies opposite the first seal such that the control element compresses the first seal to a lesser extent than in the at least one first position, wherein the decompression portion of the external contour and the compression portion of the external contour are segments of nonconcentric circles.

15. The motor vehicle as claimed in claim 14, wherein the smaller radius of curvature is configured such that it is less than a diameter of the first one of the connectors and the radius of curvature of the compression portion is configured such that it is greater than a diameter of the first one of the connectors.

16. A method for activating a multiport valve having a housing having a recess and at least two connectors, a control element configured to block at least one of the connectors, the control element being rotatably disposed in the recess of the housing, an external contour of the control element has a compression portion that in a first position of the control element compresses a first seal disposed on a first one of the connectors, a decompression portion of the external contour of the control element that has a smaller radius of curvature than a radius of curvature of the compression portion and in at least one further position of the control element lies opposite the first seal such that the control element compresses the first seal to a lesser extent than in the first position, wherein the decompression portion of the external contour and the compression portion of the external contour are segments of nonconcentric circles, comprising:

adjusting the control element to the first position, in which the compression portion compresses the first seal; and adjusting the control element to one further position, in which the decompression portion lies opposite the first seal, such that the control element compresses the first seal to a lesser extent than in the first position.

* * * * *